(12) United States Patent
Ben-Yaacov et al.

(10) Patent No.: US 7,761,176 B2
(45) Date of Patent: Jul. 20, 2010

(54) PROMOTIONAL PORTABLE MUSIC PLAYERS

(75) Inventors: Yaacov Ben-Yaacov, Douglasville, GA (US); Boaz Ben-Yaacov, Douglasville, GA (US)

(73) Assignee: Catch Media, Inc., Douglasville, GA (US)

( * ) Notice: Subject to any disclaimer, the term of this patent is extended or adjusted under 35 U.S.C. 154(b) by 983 days.

(21) Appl. No.: 10/997,606

(22) Filed: Nov. 23, 2004

(65) Prior Publication Data
US 2005/0125087 A1    Jun. 9, 2005

Related U.S. Application Data

(63) Continuation-in-part of application No. 10/829,581, filed on Apr. 21, 2004, which is a continuation-in-part of application No. 10/336,443, filed on Jan. 2, 2003, now Pat. No. 7,191,193.

(51) Int. Cl.
*G06F 17/00* (2006.01)
(52) U.S. Cl. ...................................................... 700/94
(58) Field of Classification Search .................... 700/94
See application file for complete search history.

(56) References Cited

U.S. PATENT DOCUMENTS

| | | | |
|---|---|---|---|
| 4,659,231 A * | 4/1987 | Barkouki | 368/15 |
| 5,129,036 A * | 7/1992 | Dean et al. | 704/200 |
| 5,303,326 A * | 4/1994 | Dean et al. | 704/201 |
| 5,892,536 A | 4/1999 | Logan et al. | |
| 5,892,900 A | 4/1999 | Ginter et al. | |
| 5,946,664 A * | 8/1999 | Ebisawa | 705/14 |
| 6,088,455 A | 7/2000 | Logan et al. | |
| 6,146,276 A * | 11/2000 | Okuniewicz | 463/35 |
| 6,336,219 B1 * | 1/2002 | Nathan | 725/91 |
| 6,389,162 B2 | 5/2002 | Maeda | |

(Continued)

FOREIGN PATENT DOCUMENTS

EP    1 251 440 A2    10/2002

(Continued)

OTHER PUBLICATIONS

PCS-Electronics, "RDS Max 2.0," XP002336990, Internet Article, Online!, retrieved from the Internet: http://web.archive.org/web/20040413050058/www.ppcs-electronics.com/en/products.php?sub=EDS_encod> (Mar. 22, 2004).

(Continued)

*Primary Examiner*—Curtis Kuntz
*Assistant Examiner*—Paul McCord
(74) *Attorney, Agent, or Firm*—Blakely, Sokoloff, Taylor & Zafman LLP

(57) ABSTRACT

A digital audio player, including a casing, a memory within said casing for storing digital audio including songs and a commercial, a digital-to-analog converter within said casing and operatively connected to said memory for converting digital audio to analog audio, an analog audio player within said casing and operatively coupled to said digital-to-analog converter, for playing the songs in response to manual user commands, and for automatically playing the commercial, and a processor for stopping the automatic playing of the commercial after a specific event has occurred. A method and a computer-readable storage medium are also described.

6 Claims, 7 Drawing Sheets

U.S. PATENT DOCUMENTS

| | | | |
|---|---|---|---|
| 6,449,367 | B2 | 9/2002 | Van Wie et al. |
| 6,463,444 | B1 | 10/2002 | Jain et al. |
| 6,608,930 | B1 | 8/2003 | Agnihotri et al. |
| 6,771,748 | B2 * | 8/2004 | Parker et al. ............. 379/88.16 |
| 6,834,308 | B1 | 12/2004 | Ikezoye et al. |
| 6,876,974 | B1 * | 4/2005 | Marsh et al. .................. 705/14 |
| 6,888,950 | B2 * | 5/2005 | Siskin et al. ................ 381/378 |
| 6,934,837 | B1 * | 8/2005 | Jaisimha et al. ............ 713/151 |
| 7,046,239 | B2 * | 5/2006 | Asai et al. ................... 345/211 |
| 7,046,956 | B1 * | 5/2006 | Cohen ....................... 455/3.06 |
| 7,188,186 | B1 * | 3/2007 | Meyer et al. ................ 709/231 |
| 7,191,193 | B2 | 3/2007 | Ben-Yaacov et al. |
| 7,203,966 | B2 | 4/2007 | Abburi et al. |
| 7,231,656 | B1 * | 6/2007 | Nathan ....................... 725/139 |
| 7,363,372 | B2 * | 4/2008 | Potenzone et al. .......... 709/225 |
| 7,389,273 | B2 | 6/2008 | Irwin et al. |
| 7,516,213 | B2 * | 4/2009 | Cunningham et al. ....... 709/224 |
| 2001/0018693 | A1 | 8/2001 | Jain et al. |
| 2002/0015362 | A1 * | 2/2002 | Cowgill et al. ................. 369/11 |
| 2002/0100062 | A1 * | 7/2002 | Lowthert et al. ............ 725/136 |
| 2002/0138852 | A1 | 9/2002 | Reynolds et al. |
| 2002/0177914 | A1 * | 11/2002 | Chase ......................... 700/94 |
| 2002/0184537 | A1 * | 12/2002 | Inokuchi et al. ............. 713/202 |
| 2003/0021441 | A1 | 1/2003 | Levy et al. |
| 2003/0076955 | A1 | 4/2003 | Alve et al. |
| 2003/0120541 | A1 * | 6/2003 | Siann et al. ................... 705/14 |
| 2003/0131252 | A1 | 7/2003 | Barton |
| 2003/0154378 | A1 * | 8/2003 | Hirano ....................... 713/176 |
| 2003/0158737 | A1 * | 8/2003 | Csicsatka .................... 704/273 |
| 2003/0163823 | A1 | 8/2003 | Logan et al. |
| 2003/0182184 | A1 * | 9/2003 | Strasnick et al. .............. 705/14 |
| 2003/0233929 | A1 | 12/2003 | Agnihotri et al. |
| 2004/0003398 | A1 * | 1/2004 | Donian et al. ................. 725/34 |
| 2004/0089141 | A1 * | 5/2004 | Georges et al. ............... 84/609 |
| 2004/0089142 | A1 * | 5/2004 | Georges et al. ............... 84/610 |
| 2004/0133657 | A1 * | 7/2004 | Smith et al. ................. 709/219 |
| 2004/0133908 | A1 * | 7/2004 | Smith et al. ................... 725/31 |
| 2004/0133914 | A1 * | 7/2004 | Smith et al. ................... 725/86 |
| 2004/0267390 | A1 | 12/2004 | Ben-Yaacov et al. |
| 2005/0227679 | A1 | 10/2005 | Papulov |
| 2007/0030972 | A1 * | 2/2007 | Glick et al. ................. 380/258 |

FOREIGN PATENT DOCUMENTS

| | | |
|---|---|---|
| EP | 1 304 874 A2 | 4/2003 |
| GB | 2 380 364 A | 4/2003 |
| WO | WO 01/13311 A | 2/2001 |
| WO | WO 01/46783 A2 | 6/2001 |
| WO | WO 01/62004 A | 8/2001 |
| WO | WO 03/058410 A | 7/2003 |
| WO | WO 2004/061547 A2 | 7/2004 |
| WO | WO 2005/106876 A2 | 11/2005 |

OTHER PUBLICATIONS

Amazon.com Description, "HP Jordana 545 Pocket PC," XP002336991, Internet Article, Online!, retrieved from the Internet: http://www.pdasupport..com/Jordana545.htm> (Apr. 2000).

R. Menta, "Review: Neuros MP3 Digital Audio Computer," MP3NEWSWIRE.NET, Online!, XP002336992, retrieved from the Internet: http://www.mp3newswire.net/stories/2003/neuros.html> (May 29, 2003).

Philips Research, "Audio Fingerprinting for Automatic Music Recognition," XP002347089, www.research.philips.com, Online!, retrieved from the Internet: http://www.research.philips.com/initiatives/contentid/downloads/audio_fingerprinting_leaflet.pdf> (Mar. 2004).

J. Haitsma, T. Kalker, "A highly Robust Audio Fingerprinting System," XP002347090, IRCAM, Online!, retrieved from the internet: http://ismir2002.ismir.net/proceedings/02-FP04-2.pdf (2002).

Internet Article, "IPOD track display," XP00236993, retrieved from the Internet: http://halfbakery.com/idea/IPOD_20track_20display> (Sep. 18, 2003).

Internet Article, "MINI2 Forums—RDS—Radio Text," XP002336994, retrieved from the Internet: http://www.mini2.com/forum/archive/index.php/t-24296> (Feb. 7, 2003).

Internet Article, "Digiana AudiaX FM Linker," XP002337103, retrieved from the Internet: http://www.i4u.com/article396.html> (May 30, 2003).

M. Nilsson, "ID3 tag version 2.4.0—Native Frames," XP002350036, ID3V2.4.0-frames.txt, v 1.1. Retrieved from the Internet: http:www/id3.org/id3v2.4.0-frames.txt (Nov. 1, 2000).

"GoTuit Media Secures $2.1 Million in First-Round Angel Funding Led by Topol Group," PR Newswire, pNA (Aug. 15, 2000).

PCT Notification of Transmittal of The International Search Report and the Written Opinion of the International Searching Authority or The Declaration for PCT Counterpart Application No. PCT/US05/42589 Containing International Search Report (Jun. 20, 2006).

R. Mori et al., "Superdistribution: An Electronic Infrastructure for the Economy of the Future," XP002072402, Transactions of Information Processing Society of Japan, vol. 38, No. 7, pp. 1465-1472 (Jul. 1997).

* cited by examiner

PROMOTIONAL PORTABLE MUSIC PLAYERS

CROSS REFERENCE TO RELATED APPLICATIONS

This application is a continuation-in-part of assignee's pending application U.S. application Ser. No. 10/829,581, filed on Apr. 21, 2004, entitled Portable Music Player and Transmitter, which is a continuation-in-part of assignee's application U.S. application Ser. No. 10/336,443, now U.S. Pat. No. 7,191,193, filed on Jan. 2, 2003, entitled Automatic Digital Music Library Builder. The present application claims priority to both application Ser. Nos. 10/829,581 and 10/336,443.

FIELD

Embodiments of the present invention relate to promotional digital audio players.

BACKGROUND

Programmable devices make great marketing tools. As is familiar today, applications can be programmed to cease to function upon expiration of a trial period or to disable certain functionalities. Often when a consumer purchases a computer, for example, the computer comes bundled with trial versions of software applications, such as anti-virus software or Internet software, which expire unless the full software application is purchased or subscribed to.

Of course, free merchandise is another great marketing tool. Companies often give away goods such as mouse pads, coffee mugs and key chains—goods that tend often to be within eyesight of a consumer, which bear the companies' logo, tagline, and contact information.

Cell-phones, personal data assistants ("PDAs"), and MP3 players are being distributed very broadly today and offer good marketing possibilities. Up until recently, though, the cost of goods for these devices was too high for companies to consider free distribution. Recently, however, it has become possible to manufacture MP3 players and similar devices at very low cost.

Thus a powerful opportunity has arisen for designing promotional MP3 players and similar devices, which leverage both the marketing advantages of programmable operation and the marketing advantages of free distribution.

SUMMARY OF THE DESCRIPTION

Embodiments of the present invention concern a digital audio player that has promotional features, including a commercial that automatically plays until a pre-determined event has occurred. The digital player has a logo on its casing, and for one embodiment the commercial is related to the logo. The automatic playing of the commercial is phased out over a series of stages that correspond to occurrence of corresponding events.

There is thus provided in accordance with an embodiment of the present invention a digital audio player, including a casing, a memory within said casing for storing digital audio including songs and a commercial, a digital-to-analog converter within said casing and operatively connected to said memory for converting digital audio to analog audio, an analog audio player within said casing and operatively coupled to said digital-to-analog converter, for playing the songs in response to manual user commands, and for automatically playing the commercial, and a processor for stopping the automatic playing of the commercial after a specific event has occurred.

There is additionally provided in accordance with an embodiment of the present invention a digital audio player, including a casing, a memory within said casing for storing digital audio including songs and a commercial, a digital-to-analog converter within said casing and operatively connected to said memory for converting digital audio to analog audio, an analog audio player within said casing and operatively coupled to said digital-to-analog converter, for playing the songs in response to manual user commands, and for automatically playing the commercial, and a processor within said casing and operatively coupled to said analog audio player for phased-out reduction of the automatic playing of the commercial in a series of phases, each phase being triggered by a corresponding event.

There is further provided in accordance with an embodiment of the present invention a digital audio player, including a casing, a memory within the casing for storing digital audio, a digital-to-analog converter within the casing and operatively coupled to the memory for converting digital audio to analog audio, a buzzer within the casing for emitting a buzzing signal at pre-determined times, and an analog audio player within the casing and operatively coupled to the digital-to-analog converter and to the buzzer, for playing the buzzing signal and for playing an audio segment following the buzzing signal.

There is yet further provided in accordance with an embodiment of the present invention a method for promoting a vendor, including controlling a digital audio player to automatically play a commercial (i) when the digital audio player is turned on, and (ii) when the digital audio player plays a song, and phase out said automatically playing the commercial over a series of phases, each phase being triggered by a corresponding event.

There is moreover provided in accordance with an embodiment of the present invention a computer-readable storage medium storing program code for causing a digital audio player to automatically play a commercial (i) when the digital audio player is turned on, and (ii) when the digital audio player plays a song, and phase out said automatically playing the commercial over a series of phases, each phase being triggered by a corresponding event.

Other features and advantages of embodiments of the present invention will be apparent from the detailed description and the drawings.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Figure 1:
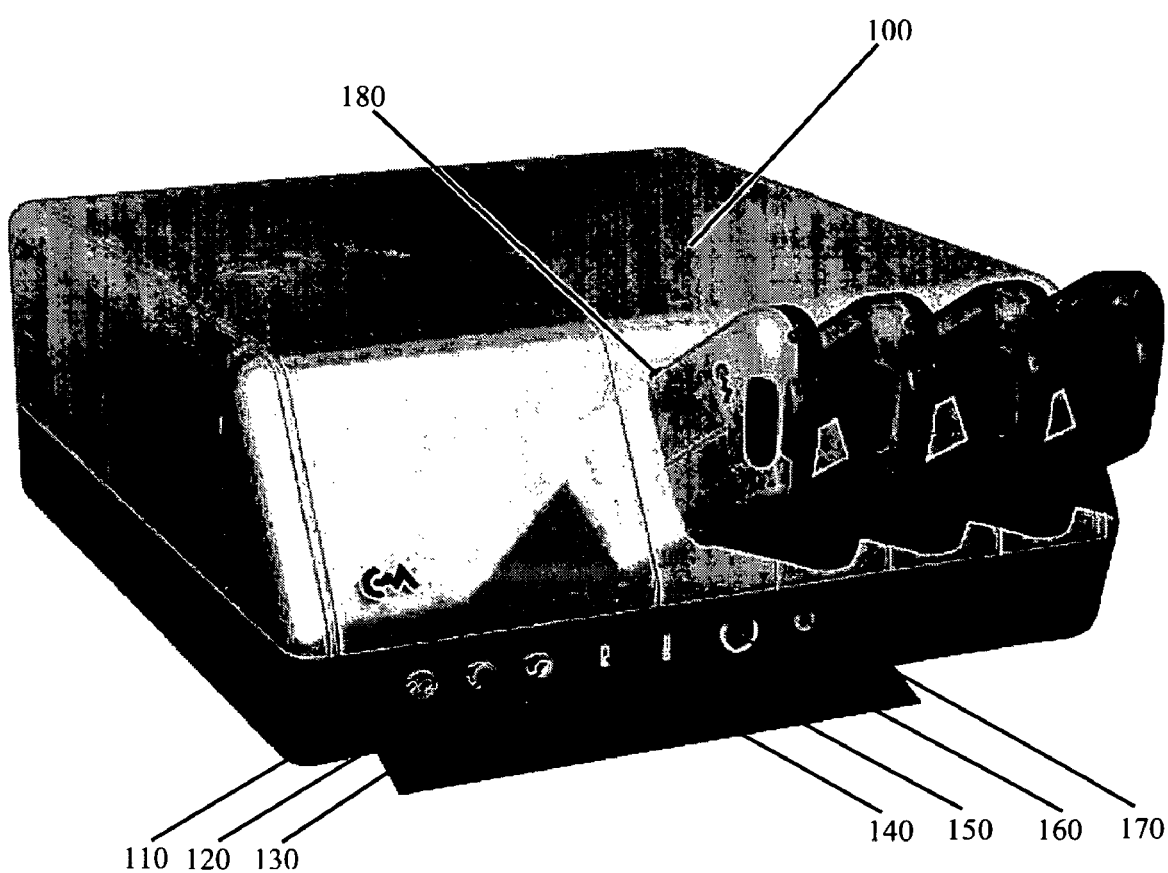
FIG. 1 is a front view of a digital archive, referred to as a "Nest;"

Digital music players are proliferating as standalone consumer electronic devices such as MP3 players, as bundled components within portable devices such as personal data assistants (PDAs) and cell-phones, and as home network appliances. Listeners typically build up their own personal libraries of digital songs, which are stored on memory units such as hard disk drives and removable memory cards. Digital songs are typically acquired through the Internet via subscription services and peer-to-peer exchanges, or by converting songs from a compact disc (CD) and importing them into an MP3 library.

Digital songs typically include audio data and auxiliary data, referred to as meta-data, used to index the songs within the listener's library. For example, MP3 files include embedded meta-data that is accessed through an ID3 Tag. WMA files include embedded meta-data in the files and also within the filenames themselves. By indexing the songs, a listener can search his library and access individual songs therein. Audio players generally provide a user interface through which users view meta-data.

Building up a digital music library requires a lot of time and work. Typically, a listener first searches the Internet for one or more songs of interest, then identifies locations of the songs, and then downloads them into a database associated with a media player. Songs are typically stored as digital files, formatted in compliance with a standard format, such as MP3 or WMA. Once the songs are downloaded, the listener generally uses player software, such as Windows Media player or Winamp, to play the songs on a computer, or alternatively he copies the songs onto a hardware device, such as an iPod™ or other MP3 player that plays the songs.

A shortcoming in the world of digital music is the great effort required to build custom music libraries at home. Often individuals spend nights on end downloading their favorite songs and building their own personal music libraries. An alternative is to purchase libraries that have been prepared by others, but often someone else's library does not match a listener's taste and the listener prefers to collect his own favorite songs.

A popular source for a listener to hear his favorite songs is on music stations. Cable, satellite broadcast and the Internet provide music channels for almost every genre of music—classical music, rock and roll, jazz, music of the 50's, etc. A listener can enjoy music according to his taste by subscribing to such broadcast services.

Applicant's co-pending U.S. patent application Ser. No. 10/336,443, entitled AUTOMATIC DIGITAL MUSIC LIBRARY BUILDER, now U.S. Pat. No. 7,191,193, filed on Jan. 2, 2003, describes a device that enables a listener to automatically copy and import songs that are broadcast from a music station into his digital music library, along with the songs' meta-data required for indexing his library. A listener, with practically no effort, can automatically build up a large digital music library with tens of thousands of his choice of songs, all properly indexed for search and retrieval.

Applicant's automatic digital music library builder is preferably embodied in a programmable device, referred to herein as a "Nest," that can interface with computers, with MP3 players and other digital music players, and with other electronic devices that include MP3 players or other digital music players therewithin, including inter alia cell phones, PDAs, home network appliances, and Internet appliances. For a first embodiment, the Nest is coupled to a satellite/cable receiver; for a second embodiment, the Nest is coupled to a television; for a third embodiment, the Nest is coupled to various external components via a USB and a Firewire connection.

The memory storing the digital music library can be either a large hard disk situated within the Nest itself, or one or more smaller removable memory units such as compact disks and memory cards, or a combination of hard disk and removable memory. The advantage of a large hard disk is that the listener's music library is consolidated into a single library that can be searched and accessed in its entirety. The advantage of removable memory units, such as compact disks, is that the listener can insert the disks into portable players such as MP3 players. Assuming that 40 songs on average require 128 MB of data and include one and a half hour's worth of listening, a large 80 GB hard disk can hold a library of approximately 25,600 songs; and a 640 MB compact disk can hold approximately 200 songs, or about 7½ hours worth of listening.

Reference is now made to FIG. 1, which is a front view of a Nest 100. Nest 100 is shown with its front panel open. On the left side of the front panel are female left and right analog audio-in connectors 110 and 120, and a female analog video-in connector 130, used for connecting auxiliary audio and video devices, such as a CD player, in order to add content into the Nest. On the right side of the front panel are female USB sockets 140 and 150, used for connecting foreign MP3 players to the Nest; a female Ethernet connector 160, for connecting the Nest to a computer network; and a mini-jack socket 170, used to provide analog stereo audio-out for headphones.

A Nest includes one or more exchange ports 180, also referred to herein as "cradles," through which one or more hand-held digital music players, referred to herein as "Eggs," can be connected to the Nest, for loading songs from a digital music library stored on the Nest thereto. Such exchange ports may be circular or oval ports into which Eggs in the shape of film canisters are inserted. Thus it may be appreciated that Eggs may be "charged up" with songs while they are plugged into the cradles of the Nest.

Figure 2:
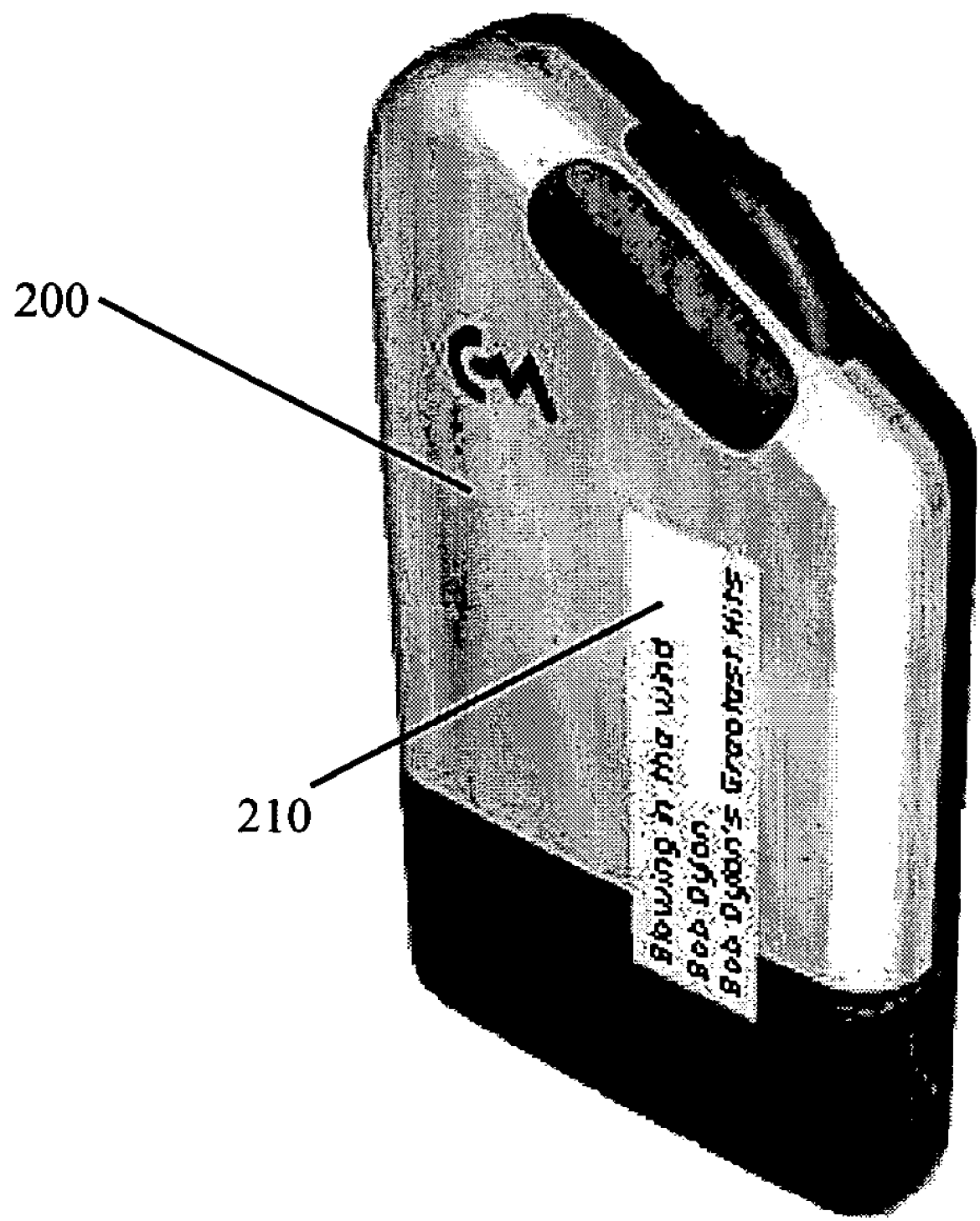
FIG. 2 is a side view of a music player, referred to as an "Egg", in accordance with an embodiment of the present invention.

FIG. 2, is a side view of an Egg 200, in accordance with an embodiment of the present invention. Egg 200 is shown with a panel 210 that displays meta-data for a song currently being played. As can be seen in FIG. 2, the meta-data includes a title ("Blowing in the Wind"), an author ("Bob Dylan") and an album ("Bob Dylan's Greatest Hits").

Figure 3:
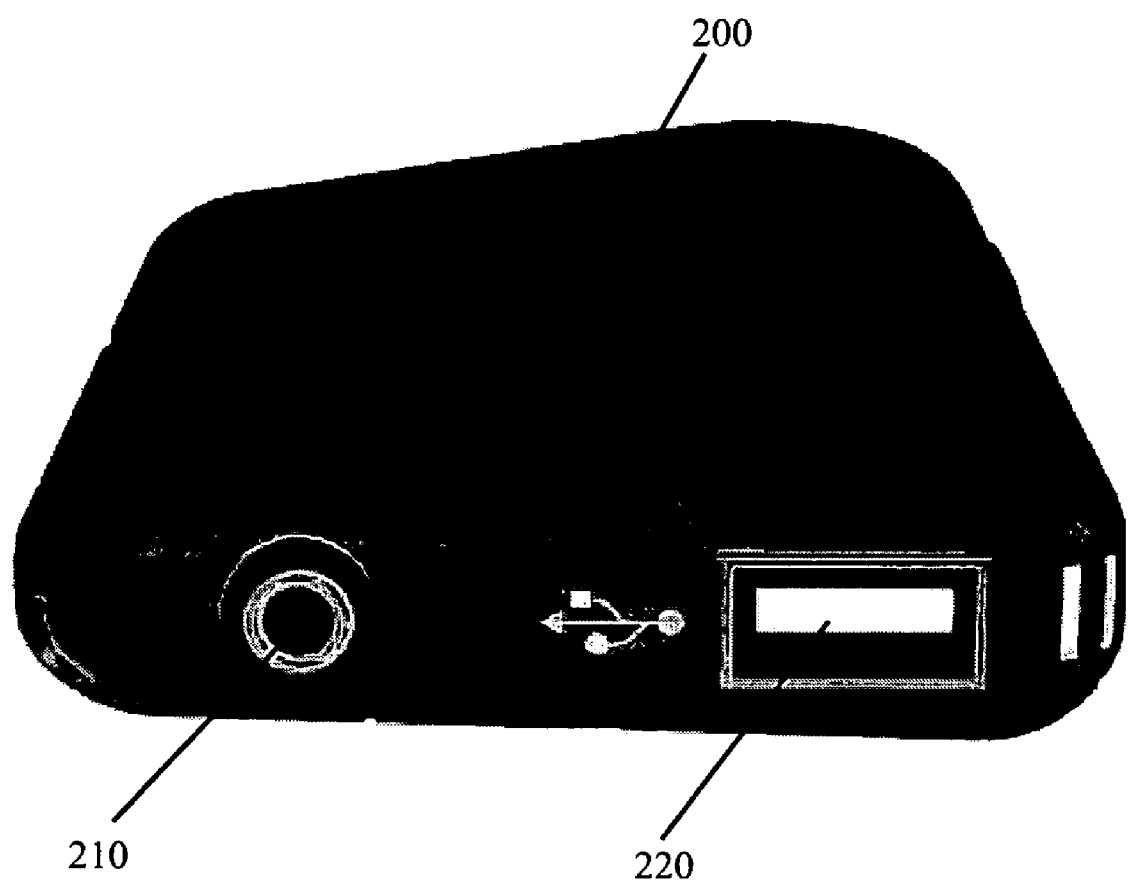
FIG. 3 is bottom view of the music player of FIG. 2, in accordance with an embodiment of the present invention.

FIG. 3 is a bottom view of Egg 200 of FIG. 2 in accordance with an embodiment of the present invention. The bottom of Egg 200 includes a female audio/video connector 210, which for one embodiment is used for transferring analog audio and analog video between the Egg and a Nest; and a female USB connector 220, which for one embodiment is used for transferring digital data between the Egg and a Nest, between the Egg and a "filling station" kiosk, and between the Egg and another Egg. Corresponding to connectors 210 and 220, the cradles of the Nest contain male analog audio/video connectors and male USB connectors (not shown in FIG. 1).

Egg 200 may optionally include SSD memory, HD memory, or a combination of SSD and HD memory. Alternatively, Egg 200 may have no writeable memory.

A typical usage scenario for a Nest and Egg is as follows. A listener sets his cable or satellite receiver box to a specific music channel, such as The Music Choice®, and activates the Nest to capture songs from the music channel. The Nest automatically creates a digital music library and imports the broadcast songs therein. Thereafter, the listener plugs an Egg into a cradle of the Nest, and downloads selected songs from the music library onto the Egg. If the Nest is connected to the listener's speaker system, then the listener may also pipe music from the Nest into speakers in various rooms. If the Nest is connected to a home network, the listener may stream audio to a computer that is authorized to work with the Nest.

In addition to the Nest being able to download songs to the Egg when the Egg is connected to the Nest, for one embodiment the Nest is also able to remove songs stored in the Egg. Thus, if the Egg storage is full, the Nest can remove songs from the Egg, in order for the Egg to download a new set of songs.

Eggs of embodiments of the present invention may receive digital music from other sources, in addition to the Nest. Thus the Eggs may be compatible with kiosks, such as music kiosks located in music distribution stores, used for listening to songs prior to purchase and for subsequent purchase. For one embodiment, when an Egg is connected to a Nest, the digital music that was received from other devices and stored within the Egg can be archived on the Nest.

An Egg may receive control commands through its USB connector. Specifically, when connected to a Nest, the Nest may issue control commands to the Egg, such as a command to advance to the next song; and when connected to a docking station, such as a docking station for the Egg in a room of a house, the docking station may receive infrared commands issued by a user, and translate them into control commands to the Egg over the USB connector.

Figure 4:
FIG. 4 is an illustration of a user interface for copying songs from the digital archive of FIG. 1 into the music player of FIG. 2, in accordance with an embodiment of the present invention.

FIG. 4 is an illustration of a graphical user interface (GUI) for copying songs from the Nest of FIG. 1 into the Egg of FIG. 2, in accordance with an embodiment of the present invention. The GUI shown in FIG. 4 is displayed on a television or other display device connected to the Nest, and interactively controlled through use of a remote control device, such as an infrared control unit. As such, the GUI of FIG. 4 is intended for navigation with simple directional buttons and a select button, such as are typically included in infrared control units.

The GUI shown in FIG. 4 is used to organize a digital music library and create playlists; i.e., sequences of songs for playing from the Nest, or for copying songs to an Egg for playback from the Egg.

Figure 5:
FIG. 5 is an illustration of a plurality of promotional Eggs in accordance with an embodiment of the present invention.

Embodiments of the present invention concern promotional Eggs, which for one embodiment are distributed for free in order to promote sales of Nests. Reference is now made to FIG. 5, which illustrates a plurality of promotional Eggs in accordance with an embodiment of the present invention.

An objective of the promotional Eggs is to provide limited but useful functionality to a consumer, and sway the consumer to purchase a Nest and upgrade the promotional Egg to a regular Egg.

Useful features and functionality of a promotional egg include, inter alia, one or more of the following:

branded design on the outside casing;
SD slot or other memory card interface;
clock display;
plays a commercial related to the branded design, or related to the distributor of the promotional Egg;
buzzer, either speaker or piezo-based;
buzzes at pre-set times of day, optionally based on geographic location, such as Jewish or Moslem prayer times that depend on sunrise and sunset; and
plays audio, such as prayers, following the buzzer.

The Egg may include SSD or HD memory. Alternatively, the Egg may have no writeable memory.

For one embodiment, the commercial played by a promotional Egg is non-erasable and is played, during a promotional period, whenever a song is played, or whenever the promotional Egg is turned on. The commercial stops playing altogether after the promotional period lapses, the promotional period lapsing upon occurrence of a pre-determined event, including, inter alia, one or both of the following:

when an offer is redeemed, such as registering the Egg with a Nest; or after a pre-determined time has elapsed.

A promotional Egg may function as an alarm clock for a prayer schedule for members of a faith that requires prayer at regular times during the day, such as the Jewish or Moslem faith. Such prayer schedules often depend on times of sunrise and sunset at a specific geographic locale.

In reading the above description, persons skilled in the art will realize that there are many apparent variations that can be applied to the methods and systems described. Thus, after a pre-determined time has elapsed, the promotional Egg may be programmed to continue to automatically play the commercial whenever the Egg is turned on, but to stop the automatic playing of the commercial that had been occurring whenever a song was played.

In this way, the automatic playing of the commercial may be phased out over stages. Specifically, at stage one, when the promotional Egg is first distributed to a consumer, the commercial is automatically played whenever the Egg is turned on and whenever the consumer plays a song. At stage two, after a pre-determined time has elapsed, the commercial continues to automatically play whenever the Egg is turned on, but no longer automatically plays when the consumer plays a song. At stage three, after the consumer registers the Egg with a Nest, the commercial stops automatically playing altogether.

Table I describes the phasing-out of the automatic playing of the commercial by the promotional Egg, in accordance with an embodiment of the present invention.

TABLE I

Phased-out reduction of automatic playing of commercial

| Phase | Triggering Event | Response |
| --- | --- | --- |
| First | Distribution of the promotional Egg to a consumer | Automatic playing of commercial occurs when the promotional Egg is turned on; and when the consumer plays a song. |
| Second | Lapse of a pre-determined time | Automatic playing of commercial occurs when the promotional Egg is turned on. |
| Third | Registration of the promotional Egg | Automatic playing of commercial occurs stops altogether. |

Figure 6:
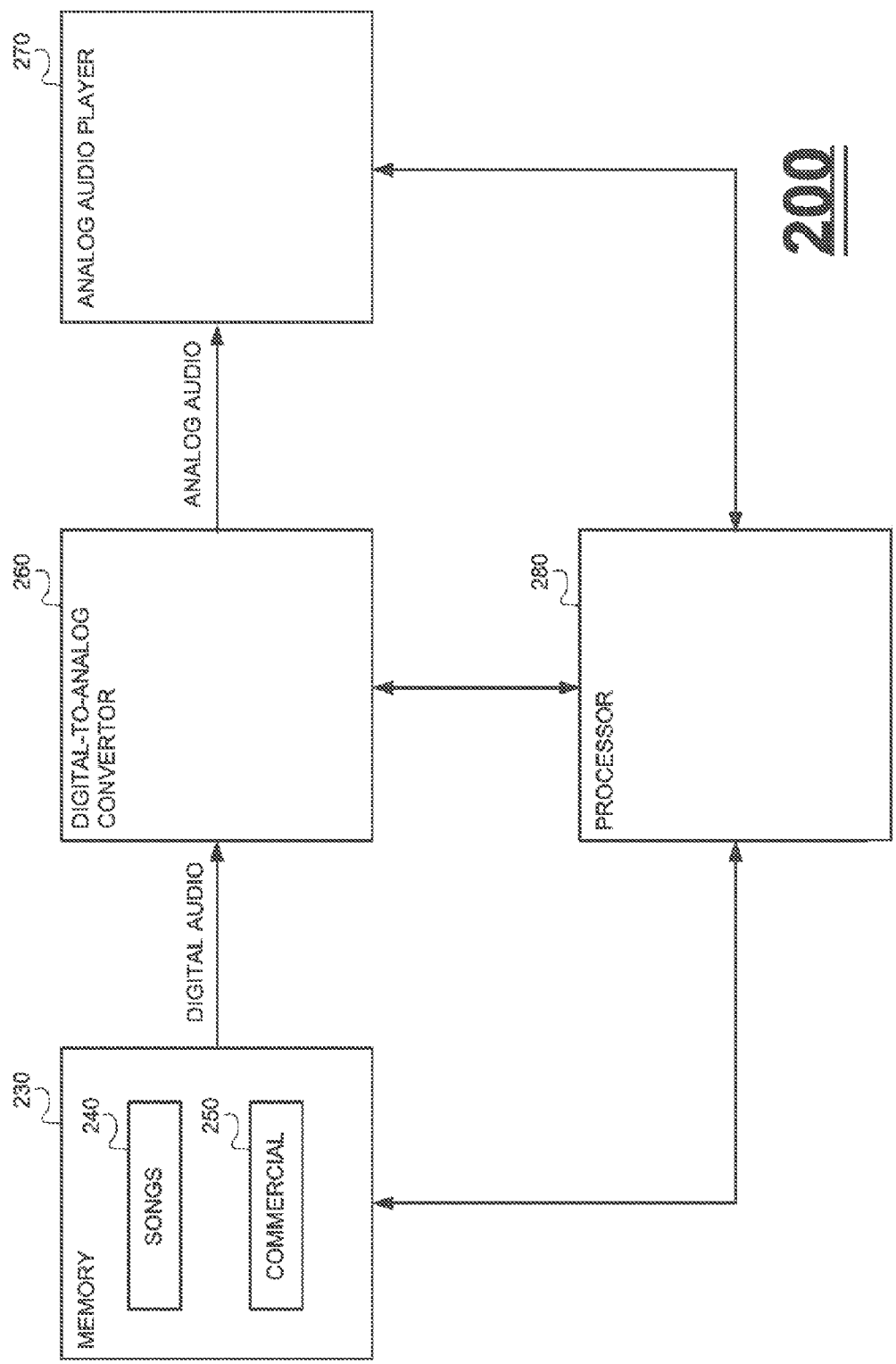
FIG. 6 is a simplified block diagram of a promotional digital audio player, in accordance with an embodiment of the present invention.

FIG. 6 is a simplified block diagram of a promotional digital audio player 200, in accordance with an embodiment of the present invention. Promotional digital audio player 200 includes a memory 230 storing digital songs 240 and a digital commercial 250. A digital-to-analog convertor 260 converts digital audio to analog audio, for playing by an analog audio player 270. A processor 280 controls the playing of songs 240 and the automatic playing of commercial 250, so that promotional digital audio player 200 automatically plays commercial 250, and phases out the automatic playing of commercial 250, as indicated in Table I hereinabove.

Figure 7:
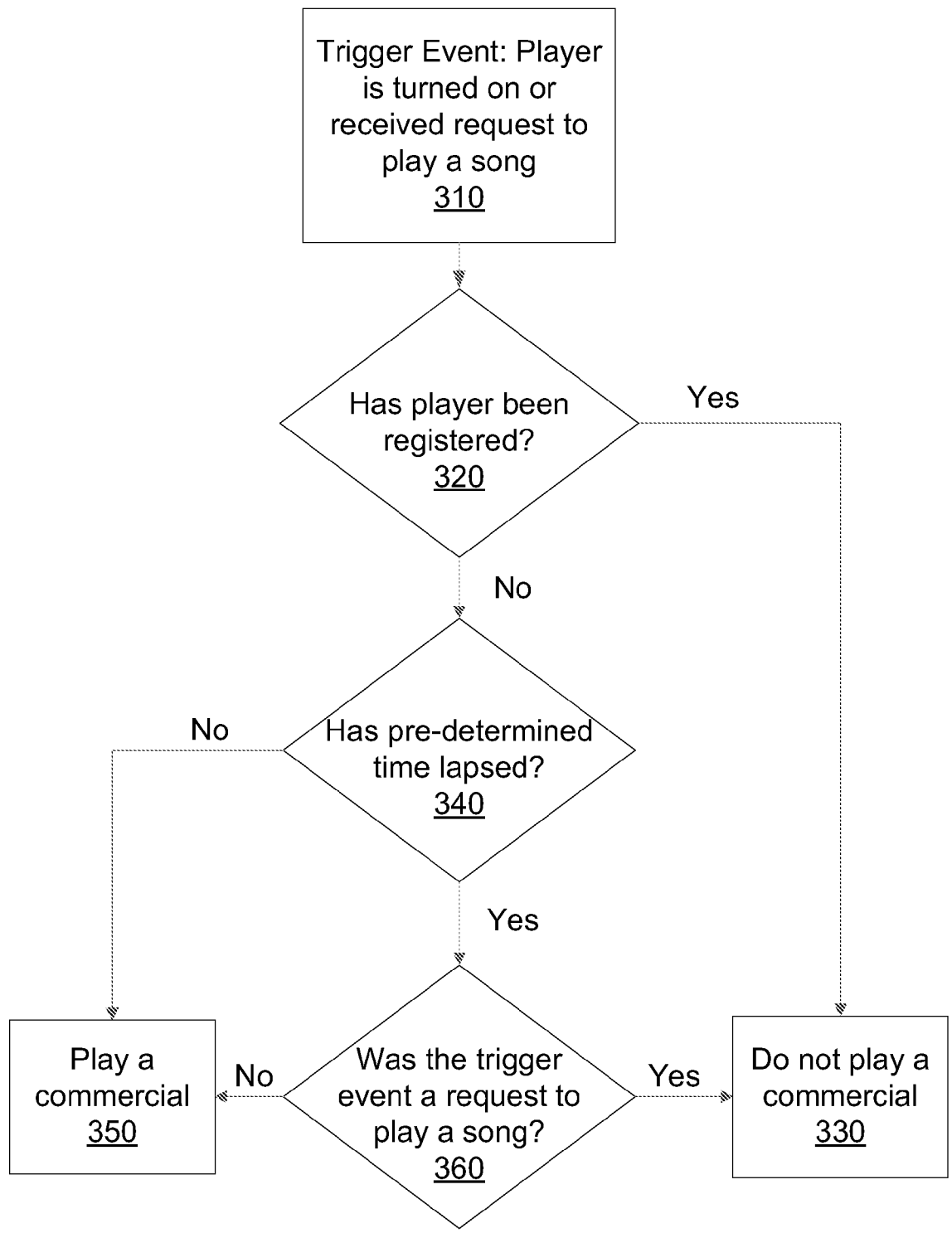
FIG. 7 is a simplified flowchart of a method for automatically playing a commercial on a promotional digital audio player, in accordance with an embodiment of the present invention.

FIG. 7 is a flowchart of a method for automatically playing a commercial on a promotional digital audio player, in accordance with an embodiment of the present invention. At operation 310 a promotional digital audio player, such as digital audio player 200 (FIG. 6), experiences a trigger event such as, for example, being turned on or receiving a request to play a song.

At operation 320, a determination is made whether or not the promotional digital audio player has been registered. If so, at operation 330, a processor of the digital audio player, such as processor 280 (FIG. 6) does not cause a commercial, such as commercial 250 (FIG. 6), to be automatically played.

Otherwise, if operation 320 determines that the promotional digital audio player has not been registered, then the method advances to operation 340, where a determination is made whether or not a designated time period has elapsed. If not, at operation 350, the processor causes the commercial to be played.

Otherwise, if operation 340 determines that the designated time period has elapsed, then the method advances to operation 360, where a determination is made whether the trigger event was a request to play a song. If the trigger event was not a request to play a song, at operation 350, the processor causes the commercial to be played. Otherwise, if the trigger event was a request to play a song, at operation 330, the processor does not cause the commercial to be played.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A digital audio player, comprising:
   a casing;
   a memory within said casing to store digital audio including songs and a commercial;
   a digital-to-analog converter within said casing and operatively connected to said memory to convert digital audio to analog audio;
   an analog audio player within said casing and operatively coupled to said digital-to-analog converter, to play the songs in response to manual user commands, and to automatically play the commercial; and
   a processor within said casing and operatively coupled to said analog audio player, to register the digital audio player with a host device upon manual user instruction to do so, and to control said analog audio player to automatically play the commercial intermittently, and to reduce the intermittency of the automatic playing of the commercial in a series of phases, one phase being triggered by lapse of a pre-determined time and another phase being triggered by registration of the processor registering the digital audio player with the host device.

2. The digital audio player of claim 1, wherein the digital audio player can be turned on and off, and wherein said processor controls said analog audio player to automatically play the commercial (i) when the digital audio player is turned on, and (ii) prior to said analog audio player playing a song, before the phased-out reduction of the intermittency of the automatic playing is effected.

3. The digital audio player of claim 2, wherein said processor controls said analog audio player to cease automatic playing of the commercial prior to said analog audio player playing a song after a lapse of the pre-determined time.

4. The digital audio player of claim 2, wherein said processor controls said analog audio player to cease automatic playing of the commercial when the digital audio player is turned on after said processor registers the digital audio player with the host device.

5. The digital audio player of claim 1, wherein said memory includes read-only memory.

6. The digital audio player of claim 1, wherein said memory includes writeable memory.

* * * * *